(12) United States Patent
Fujii et al.

(10) Patent No.: US 7,991,372 B2
(45) Date of Patent: Aug. 2, 2011

(54) RECEIVER AND ELECTRONIC APPARATUS USING THE SAME

(75) Inventors: Takeshi Fujii, Osaka (JP); Hiroaki Ozeki, Osaka (JP)

(73) Assignee: Pansonic Corporation, Osaka (JP)

( * ) Notice: Subject to any disclaimer, the term of this patent is extended or adjusted under 35 U.S.C. 154(b) by 308 days.

(21) Appl. No.: 11/916,317

(22) PCT Filed: Feb. 8, 2007

(86) PCT No.: PCT/JP2007/052259
§ 371 (c)(1),
(2), (4) Date: Dec. 3, 2007

(87) PCT Pub. No.: WO2007/094238
PCT Pub. Date: Aug. 23, 2007

(65) Prior Publication Data
US 2009/0227218 A1    Sep. 10, 2009

(30) Foreign Application Priority Data

Feb. 14, 2006  (JP) .................................. 2006-036286

(51) Int. Cl.
*H04B 1/06* (2006.01)
(52) U.S. Cl. ...... 455/255; 455/265; 455/313; 455/552.1
(58) Field of Classification Search .......... 455/313–334, 455/255–265, 302, 552.1–553.1
See application file for complete search history.

(56) References Cited

U.S. PATENT DOCUMENTS

| | | | |
|---|---|---|---|
| 6,917,803 B2 * | 7/2005 | Hata | 455/323 |
| 7,203,466 B2 * | 4/2007 | Muschallik et al. | 455/552.1 |
| 7,236,762 B2 * | 6/2007 | Asikainen et al. | 455/323 |
| 7,373,124 B2 * | 5/2008 | Okanobu | 455/302 |
| 7,502,595 B2 * | 3/2009 | Futamura et al. | 455/76 |
| 7,567,610 B2 * | 7/2009 | Adan et al. | 455/73 |
| 7,715,802 B2 * | 5/2010 | Yoshida et al. | 455/260 |
| 2001/0027092 A1 * | 10/2001 | Muschallik et al. | 455/318 |
| 2005/0090207 A1 | 4/2005 | Oiwa | |
| 2005/0117664 A1 * | 6/2005 | Adan et al. | 375/316 |
| 2006/0046678 A1 * | 3/2006 | Noda et al. | 455/302 |
| 2006/0154640 A1 * | 7/2006 | Oh et al. | 455/326 |

FOREIGN PATENT DOCUMENTS

| | | |
|---|---|---|
| JP | 05-259930 | 10/1993 |
| JP | 2003-188753 | 7/2003 |
| JP | 2003-204279 | 7/2003 |
| JP | 2005-130279 | 5/2005 |
| JP | 2005130279 | * 5/2005 |
| JP | 2005-303587 | 10/2005 |

OTHER PUBLICATIONS

Japanese Office action for JP2006-036286 dated Jan. 18, 2011.

* cited by examiner

*Primary Examiner* — Lana Le
(74) *Attorney, Agent, or Firm* — Pearne & Gordon LLP

(57) ABSTRACT

A radio receiver for diversity has a first receiving unit and a second receiving unit for diversity-receiving a signal of a radio frequency. The first receiving unit has a first mixer for converting the received signal of the radio frequency into an IF signal of a first intermediate frequency by an upper local method, and a first filter coupled to the output side of the first mixer. The second receiving unit has a second mixer for converting the received signal of the radio frequency into an IF signal of a second intermediate frequency by a lower local method, and a second filter coupled to the output side of the second mixer. The radio receiver can improve receiving sensitivity.

10 Claims, 6 Drawing Sheets

RECEIVER AND ELECTRONIC APPARATUS USING THE SAME

THIS APPLICATION IS A U.S. NATIONAL PHASE APPLICATION OF PCT INTERNATIONAL APPLICATION PCT/JP2007/052259

TECHNICAL FIELD

The present invention relates to a receiver for receiving a signal, and an electronic apparatus using it.

BACKGROUND ART

A conventional receiver is described with reference to FIG. 5. In FIG. 5, conventional receiver 1 has first receiving unit 2 and second receiving unit 3 for diversity-receiving a signal of a radio frequency from the outside. First receiving unit 2 and second receiving unit 3 have first mixer 4 and second mixer 5 for converting the signal of the radio frequency from the outside into an intermediate frequency (IF) signal of an intermediate frequency by one of an upper local method and a lower local method, respectively. First receiving unit 2 and second receiving unit 3 also have first filter 6 and second filter 7 connected to the output side of first mixer 4 and the output side of second mixer 5, respectively.

An example of the conventional art document information related to the invention of this application is Patent document 1.

In conventional receiver 1, the frequency of a local signal supplied to first mixer 4 is substantially equal to the frequency of a local signal supplied to second mixer 5, and the difference between these frequencies is very small. When the local signal to be supplied to first mixer 4 and the local signal to be supplied to second mixer 5 accidentally come as noise into second mixer 5 and first mixer 4, respectively, beat noise occurs in second mixer 5 and first mixer 4. The beat noise occurs at an extremely low frequency and the noise frequency gets close to an intermediate frequency, so that the noise is difficult to be removed by first filter 6 or second filter 7 and the receiving performance of receiver 1 degrades.

[Patent document 1] Japanese Patent Unexamined Publication No. 2005-130279

SUMMARY OF THE INVENTION

The present invention improves the receiving performance of a receiver.

The receiver of the present invention has a first receiving unit and a second receiving unit for diversity-receiving a signal of a radio frequency. The first receiving unit includes the following elements:
  a first mixer for converting the received signal of the radio frequency into an IF signal of a first intermediate frequency by an upper local method; and
  a first filter coupled to the output side of the first mixer.
The second receiving unit includes the following elements:
  a second mixer for converting the received signal of the radio frequency into an IF signal of a second intermediate frequency by a lower local method; and
  a second filter coupled to the output side of the second mixer.
Thanks to this structure, the frequency difference between the local signal supplied to the first mixer and the local signal supplied to the second mixer can be increased. Therefore, even when the local signal to be supplied to the first mixer and the local signal to be supplied to the second mixer accidentally come as noise into second mixer and first mixer, respectively, the noise can be removed by the first filter or second filter and hence the receiving performance of the receiver can be improved.

Figure 1A:
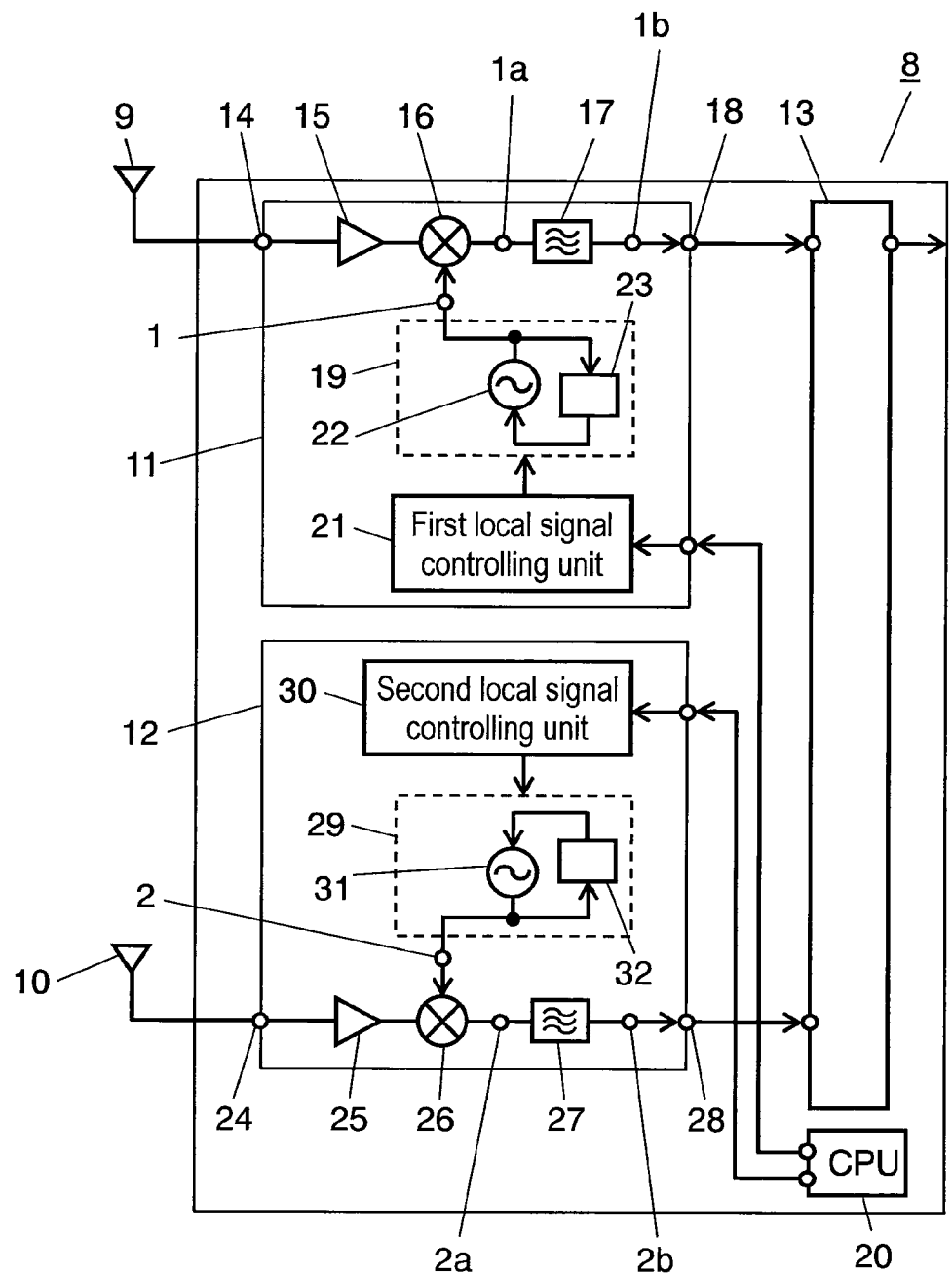
FIG. 1A is a block diagram of a receiver in accordance with a first exemplary embodiment of the present invention.

REFERENCE MARKS IN THE DRAWINGS 8 receiver
9 first antenna
10 second antenna
11 first receiving unit
12 second receiving unit
13 demodulating unit
14 first antenna terminal
15 first high-frequency amplifier
16 first mixer
17 first filter
18 first output terminal
19 first local signal generating unit
20 CPU
21 first local signal controlling unit
22 first local oscillator
23 first PLL
24 second antenna terminal
25 second high-frequency amplifier
26 second mixer
27 second filter
28 second output terminal
29 second local signal generating unit
30 second local signal controlling unit
31 second local oscillator
32 second PLL
33 first image rejection mixer
34 second image rejection mixer
35, 36, 37, 38 mixers
40 electronic apparatus
41 signal processing unit
42 display unit
43 voice reproducing unit

DETAILED DESCRIPTION OF PREFERRED EMBODIMENTS

First Exemplary Embodiment

A first exemplary embodiment of the present invention will be described hereinafter with reference to FIG. 1A and FIG. 1B.

FIG. 1A is a block diagram of a receiver in accordance with a first exemplary embodiment of the present invention. In FIG. 1A, receiver 8 has first receiving unit 11 and second receiving unit 12 that are coupled to first antenna 9 and second antenna 10 and diversity-receive a signal of a radio frequency from the outside using first antenna 9 and second antenna 10, respectively. Receiver 8 has demodulating unit 13 for demodulating the IF signals of an intermediate frequency supplied from first receiving unit 11 and second receiving unit 12.

Figure 1B:
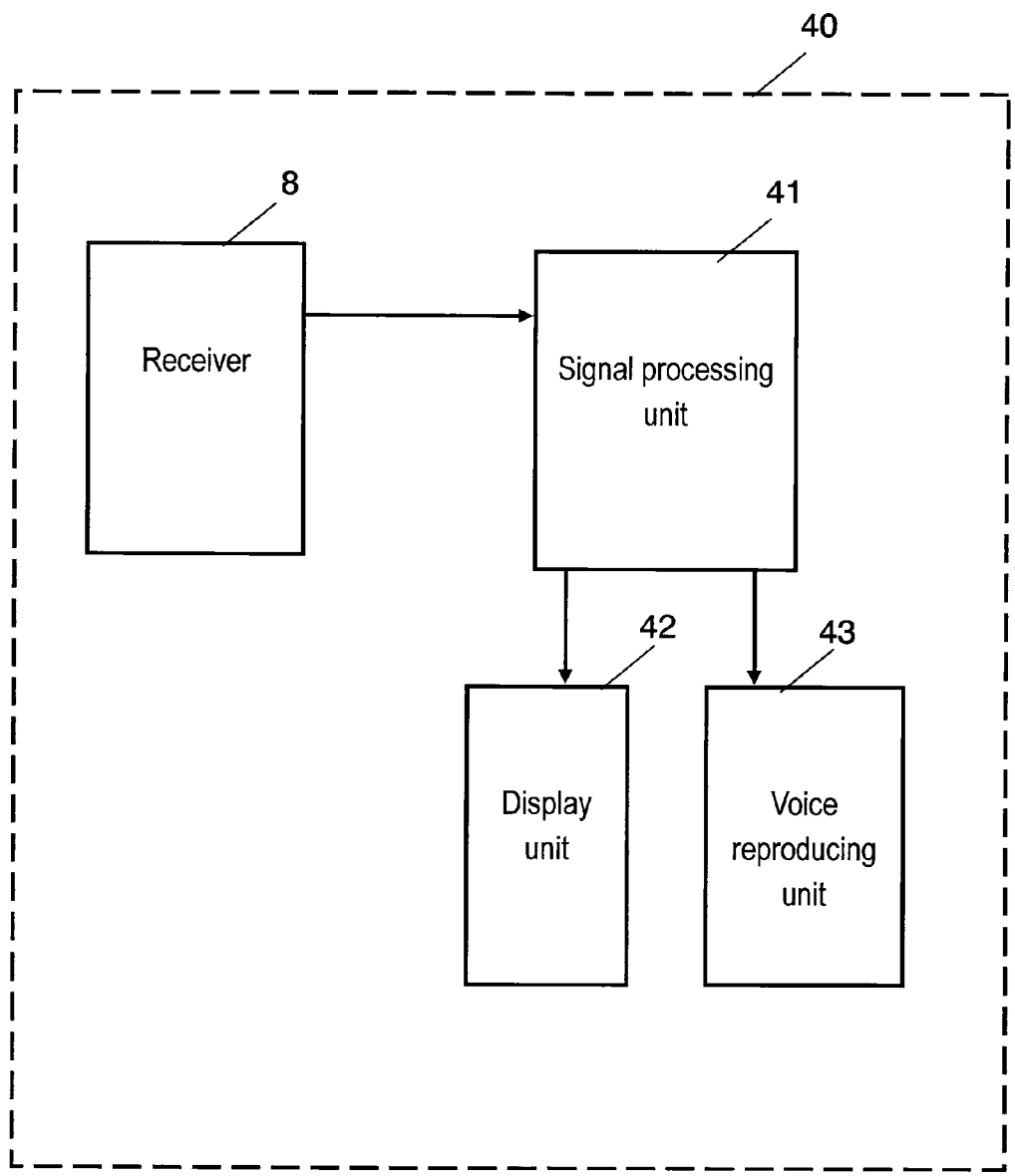
FIG. 1B is a block diagram of an electronic apparatus using the receiver in accordance with the first exemplary embodiment.

FIG. 1B is a block diagram of an electronic apparatus using the receiver in accordance with a first exemplary embodiment. Electronic apparatus 40 using the receiver includes the following elements:

signal processing unit 41 coupled to the output side of demodulating unit 13; and display unit 42 such as a liquid crystal display and voice reproducing unit 43 such as a speaker that are coupled to the output side of signal processing unit 41.

In FIG. 1A, first receiving unit 11 includes the following elements:

first antenna terminal 14 for receiving a signal of a radio frequency;

first input filter (not shown) coupled to first antenna terminal 14; and first high-frequency amplifier 15.

First receiving unit 11 also includes the following elements:

first mixer 16 coupled to the output side of first high-frequency amplifier 15;

first filter 17 coupled to the output side of first mixer 16; and first output terminal 18 coupled to the output side of first filter 17.

First receiving unit 11 also includes the following elements:

first local signal generating unit 19 coupled to the other input side of first mixer 16; and first local signal controlling unit 21 for controlling first local signal generating unit 19 based on a signal from central processing unit (CPU) 20.

First local signal generating unit 19 has first local oscillator 22 for supplying a local signal to first mixer 16, and has first phase-locked loop (PLL) 23 loop-coupled to first local oscillator 22.

Similarly, second receiving unit 12 includes the following elements:

second antenna terminal 24 for receiving a signal of a radio frequency;

second input filter (not shown) coupled to second antenna terminal 24; and second high-frequency amplifier 25.

Second receiving unit 12 also includes the following elements:

second mixer 26 coupled to the output side of second high-frequency amplifier 25;

second filter 27 coupled to the output side of second mixer 26; and second output terminal 28 coupled to the output side of second filter 27.

Second receiving unit 12 also includes the following elements:

second local signal generating unit 29 coupled to the other input side of second mixer 26; and second local signal controlling unit 30 for controlling second local signal generating unit 29 based on a signal from CPU 20.

Second local signal generating unit 29 has second local oscillator 31 for supplying a local signal to second mixer 26, and has second PLL 32 loop-coupled to second local oscillator 31.

Operation of receiver 8 in consideration of a specific receiving state is described hereinafter with reference to FIG. 2.

Figure 2:
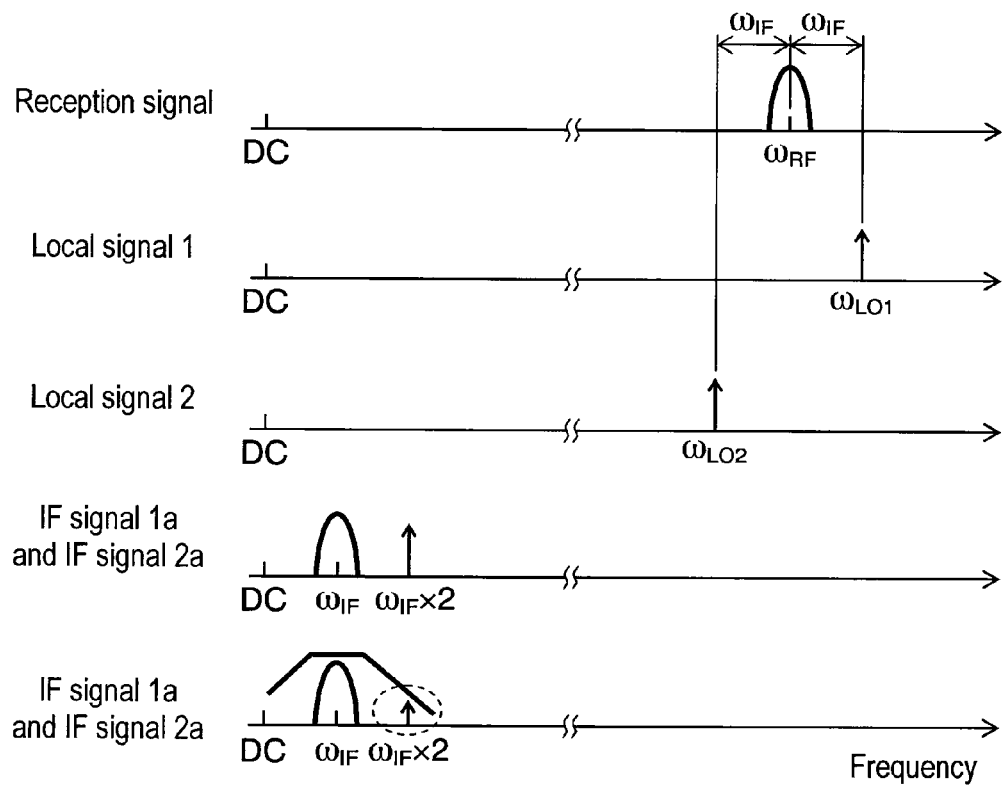
FIG. 2 is a frequency spectrum diagram in accordance with the first exemplary embodiment.

FIG. 2 is a frequency spectrum diagram in accordance with the first exemplary embodiment of the present invention. In FIG. 2, the radio frequency diversity-received by receiver 8 from first and second antenna terminals 14 and 24 is assumed to be "$\omega_{RF}$". The frequencies of local signal 1 and local signal 2 fed into first and second mixers 16 and 26 from first and second local signal generating units 19 and 29 are assumed to be first frequency "$\omega_{LO1}$" and second frequency "$\omega_{LO2}$". The case is assumed where a first intermediate frequency of the IF signal supplied from first mixer 16 and a second intermediate frequency of the IF signal supplied from second mixer 26 are equal intermediate frequency "$\omega_{IF}$".

First mixer 16 of first receiving unit 11 receives local signal 1 "$\omega_{LO1}=\omega_{RF}+\omega_{IF}$" of the upper local method from first local oscillator 22, and converts radio frequency "$\omega_{RF}$" into intermediate frequency "$\omega_{IF}$". Second mixer 26 of second receiving unit 12 receives local signal 2 "$\omega_{LO2}=\omega_{RF}-\omega_{IF}$" of the lower local method from second local oscillator 31, and converts radio frequency "$\omega_{RF}$" into intermediate frequency "$\omega_{IF}$". Therefore, the frequency difference between local signal 1 and local signal 2 is "$\omega_{LO1}-\omega_{LO2}=\omega_{IF}\times2$".

IF signal 1a and IF signal 2a as output signals from first mixer 16 and second mixer 26 are signals produced by superimposing intermediate frequency "$\omega_{IF}$" on frequency "$\omega_{IF}\times2$" of beat noise generated by interference of local signal 1 and local signal 2. Frequency "$\omega_{IF}\times2$" of the generated beat noise is the frequency that is twice the intermediate frequency and significantly apart from the intermediate frequency, so that frequency "$\omega_{IF}\times2$" can be easily removed by first filter 17 and second filter 27. First filter 17 and second filter 27 are required to have a filter characteristic where the signal of intermediate frequency "$\omega_{IF}$", of the signals from first mixer 16 and second mixer 26, is allowed to pass through the filters and the beat noise of frequency "$\omega_{IF}\times2$" at least twice the intermediate frequency is attenuated.

Thanks to this structure, the frequency difference between the local signal supplied to first mixer 16 and the local signal supplied to second mixer 26 can be increased. Therefore, even when the local signal to be supplied to first mixer 16 and the local signal to be supplied to second mixer 26 accidentally come as noise into second mixer 26 and first mixer 16, respectively, generated beat noise can be removed by first filter 17 and second filter 27 and hence the receiving performance of receiver 8 can be improved. Even when first and second filters 17 and 27 are inexpensive filter circuits of low order, they can output IF signals from which frequency causing the beat noise is sufficiently removed, and can achieve diversity-receiving with smaller circuits.

The first input filter (not shown) coupled between first antenna terminal 14 and first mixer 16 preferably attenuates an image interfering signal of frequency "$\omega_{RF}+2\omega_{IF}$" obtained by adding twice the intermediate frequency to the radio frequency. The second input filter (not shown) coupled between second antenna terminal 24 and second mixer 26 preferably attenuates an image interfering signal of frequency "$\omega_{RF}-2\omega_{IF}$" obtained by subtracting twice the intermediate frequency from the radio frequency. Therefore, the image interfering signals can be removed by the first and second input filters, and the receiving performance of receiver 8 can be improved.

The IF signal supplied from first receiving unit 11 and the IF signal supplied from second receiving unit 12 are output signals by the upper local and lower local methods, respectively, so that the frequency spectra are mutually inverse. Therefore, preferably, demodulating unit 13 for demodulating the IF signals has a function of inverting the frequency spectrum of one of the IF signals. Thus, the frequency spectrum of the IF signal supplied from first receiving unit 11 can match with that of the IF signal supplied from second receiving unit 12.

Receiver 8 may include the following elements:
a detecting unit (not shown) for detecting reception quality of the signal received by first receiving unit 11 and reception quality of the signal received by second receiving unit 12; and
a switching circuit (not shown) for switching first receiving unit 11 from the upper-local-type frequency converting method to the lower-local-type frequency converting method, and switching second receiving unit 12 from the lower-local-type frequency converting method to the upper-local-type frequency converting method, based on the detection result by the detecting unit.

Thus, the receiving method can be changed depending on the existence of the image interfering signal in each of receiving units 11 and 12, so that the reception quality of receiver 8 can be improved.

Demodulating unit 13 has a first analog-to-digital (AD) converter (not shown) coupled to the output side of first receiving unit 11, and a second AD converter (not shown) coupled to the output side of second receiving unit 12. Preferably, these AD converters convert an analog signal to a digital signal based on a sampling signal of sampling frequency other than twice the intermediate frequency "$2\omega_{IF}$". Thus, a reception quality degradation can be suppressed which is caused by the accident that beat noise of frequency "$2\omega_{IF}$" twice the intermediate frequency mixes with the sampling signal. Here, this beat noise has not been completely attenuated by first filter 17 and second filter 27.

The first intermediate frequency of the IF signal supplied from first receiving unit 11 may be different from the second intermediate frequency of the IF signal supplied from second receiving unit 12. In this case, in the first filter and second filter, the frequency to be attenuated is frequency "$\omega_{LO1}-\omega_{LO2}$", namely the difference between the first frequency and second frequency. When the sampling frequency in the first AD converter and second AD converter is set at a frequency other than frequency "$\omega_{LO1}-\omega_{LO2}$", namely the difference between the first frequency and second frequency, mixing of the beat noise with the sampling signal can be suppressed.

First mixer 16 and second mixer 26 may perform the frequency conversion for increasing the frequencies of the signals from antennas 9 and 10, respectively. The receiver may have a mixer for further frequency-converting the first IF signal supplied from each of first mixer 16 and second mixer 26 to the second IF signal.

Second Exemplary Embodiment

A second exemplary embodiment of the present invention will be described hereinafter with reference to FIG. 3. Elements similar to those in the first exemplary embodiment are denoted with the same reference marks, and the descriptions of those elements are omitted. Points of difference between the first exemplary embodiment and second exemplary embodiment are described in detail.

Figure 3:
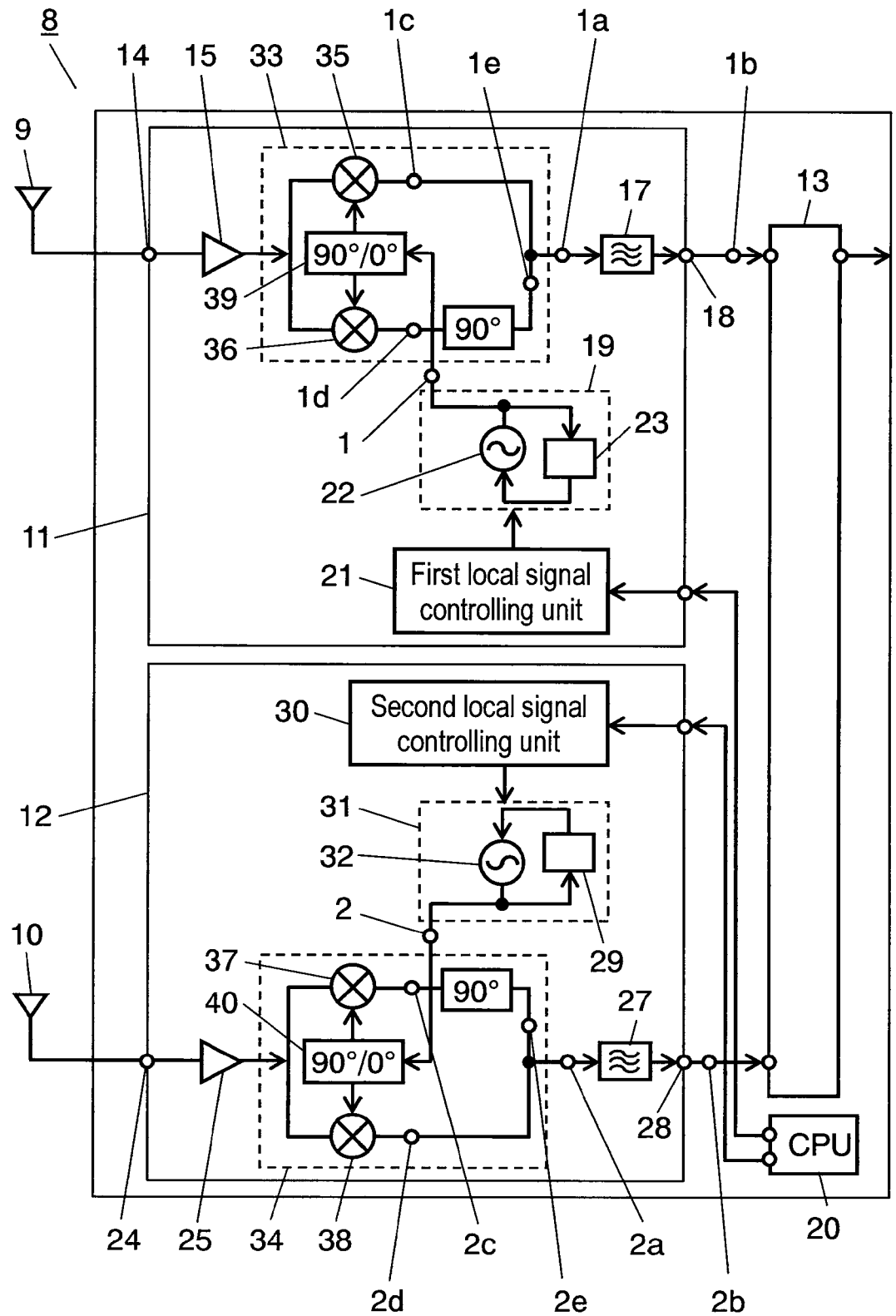
FIG. 3 is a block diagram of a receiver in accordance with a second exemplary embodiment of the present invention.

FIG. 3 is a block diagram of receiver 8 in accordance with the second exemplary embodiment of the present invention.

In the second exemplary embodiment, first mixer 16 and second mixer 26 in the first exemplary embodiment are replaced by first and second image rejection mixers 33 and 34. The second exemplary embodiment differs from the first exemplary embodiment in that the image removing method of each of first and second image rejection mixers 33 and 34 depends on the frequency converting method to the IF signal, namely the upper local method or lower local method.

In FIG. 3, first receiving unit 11 has first image rejection mixer 33 coupled to the output side of first high-frequency amplifier 15, and second receiving unit 12 has second image rejection mixer 34 coupled to the output side of second high-frequency amplifier 25.

First image rejection mixer 33 has two mixers 35 and 36 coupled to the output side of first high-frequency amplifier 15. Mixer 35 receives a reception signal supplied from the first high-frequency amplifier 15 side and local signal LO1$i$ supplied from first local signal generating unit 19 side. Mixer 36 receives a reception signal supplied from the first high-frequency amplifier 15 side and local signal LO1$q$ having phase difference of 90° with respect to local signal LO1$i$. Two mixers 35 and 36 output two IF signals 1$c$ and 1$d$ between which phase difference is 90° at the intermediate frequency, respectively. Phase shift processing of advancing the phase by 90° is applied to IF signal 1$d$ whose phase is 90° delaying, of IF signals 1$c$ and 1$d$. IF signal 1$a$ obtained by adding IF signal 1$e$ obtained by the phase shift processing to the other IF signal 1$c$ is supplied to first filter 17.

Similarly, second image rejection mixer 34 has two mixers 37 and 38 coupled to the output side of second high-frequency amplifier 25. Mixer 37 receives a reception signal supplied from the second high-frequency amplifier 25 side and local signal LO2$i$ supplied from second local signal generating unit 31 side. Mixer 38 receives a reception signal supplied from the second high-frequency amplifier 25 side and local signal LO2$q$ having phase difference of 90° with respect to local signal LO2$i$. Two mixers 37 and 38 output two IF signals 2$c$ and 2$d$ between which phase difference is 90° at the intermediate frequency, respectively. Phase shift processing of further advancing the phase by 90° is applied to IF signal 2$c$ whose phase is 90° leading, of IF signals 2$c$ and 2$d$. IF signal 2$a$ obtained by adding IF signal 2$e$ obtained by the phase shift processing to the other IF signal 2$d$ is supplied to second filter 27.

Operation of receiver 8 of second embodiment in consideration of a specific receiving state is described hereinafter with reference to FIG. 4.

Figure 4:
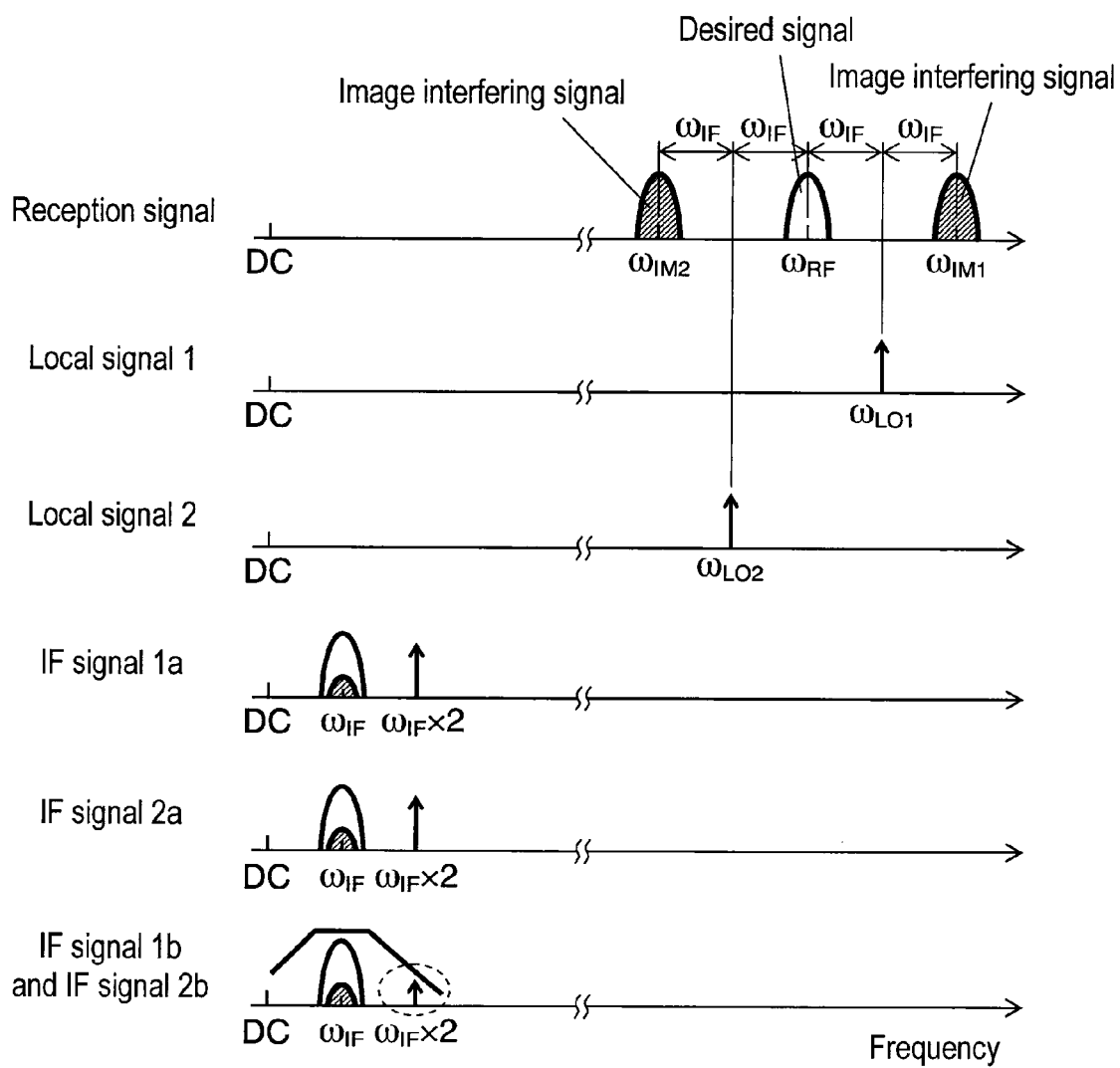
FIG. 4 is a frequency spectrum diagram in accordance with the second exemplary embodiment.
Figure 5:
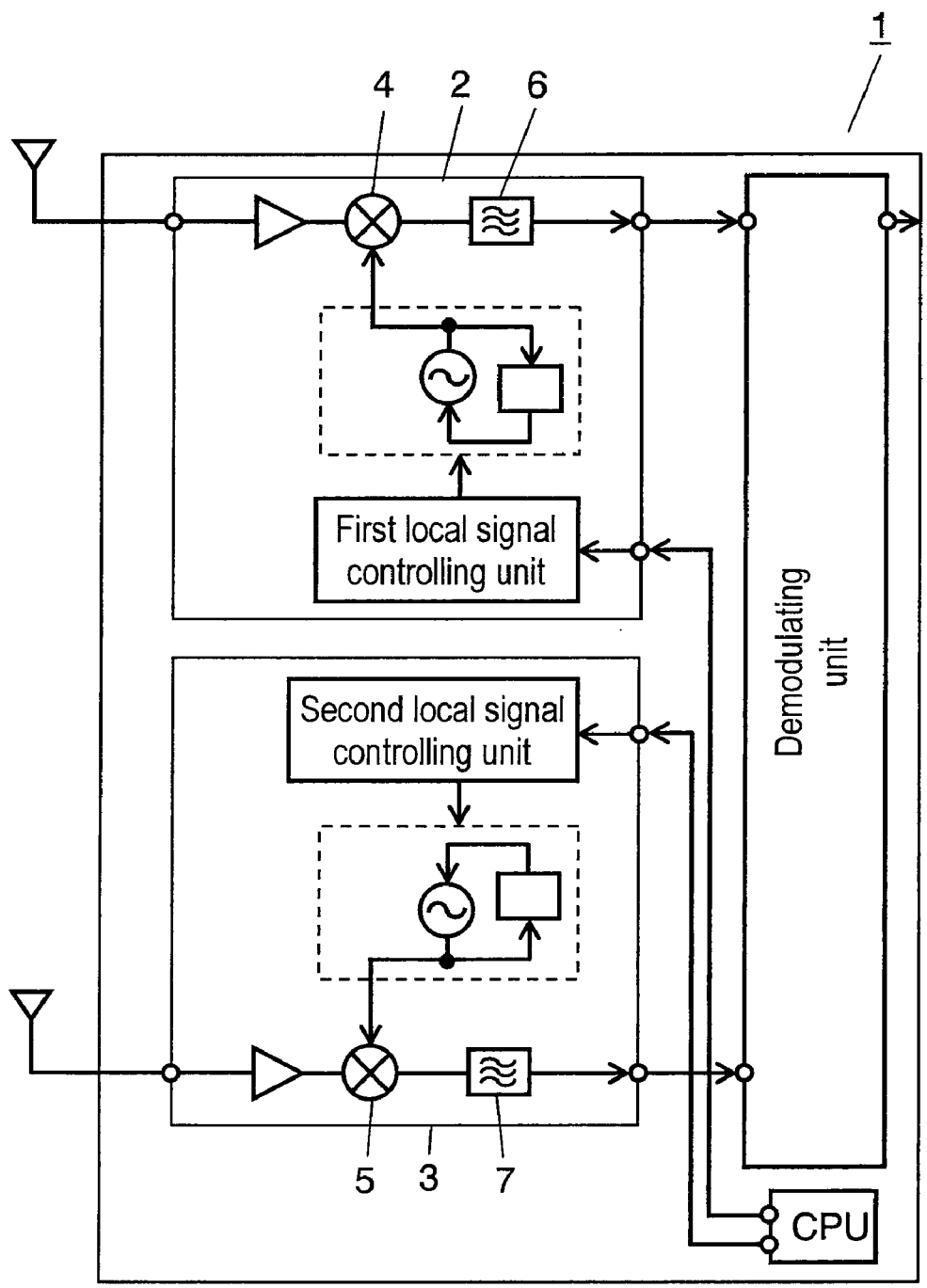
FIG. 5 is a block diagram of a conventional receiver.

FIG. 4 is a frequency spectrum diagram in accordance with the second exemplary embodiment of the present invention.

In FIG. 4, the frequency of a desired signal diversity-received by receiver 8 is assumed to be "$\omega_{RF}$", the frequency serving as an image interfering signal for first receiving unit 11 is assumed to be "$\omega_{IM1}$", and the frequency serving as an image interfering signal for second receiving unit 12 is assumed to be "$\omega_{IM2}$". The frequencies of local signal 1 and local signal 2 are assumed to be first frequency "$\omega_{LO1}$" and second frequency "$\omega_{LO2}$", respectively. First receiving unit 11 converts the desired frequency "$\omega_{RF}$" received from first antenna terminal 14 into IF signal "$\omega_{IF}$" at first frequency "$\omega_{LO1}$" of the upper local method, so that the frequencies of these signals establish relationship "$\omega_{IM1}-\omega_{LO1}=\omega_{LO1}-\omega_{RF}=\omega_{IF}$". Second receiving unit 12 converts the desired frequency "$\omega_{RF}$" received from second antenna terminal 24 into IF signal "$\omega_{IF}$" at second frequency "$\omega_{LO2}$" of the lower local method, so that the frequencies of these signals establish relationship "$\omega_{LO2}-\omega_{IM2}=\omega_{RF}-\omega_{LO2}=\omega_{IF}$".

In first receiving unit 11, reception signal RF1 fed from first antenna terminal 14 and local signals LO1$i$ and LO1$q$ supplied from first local signal generating unit 19 to mixers 35 and 36, respectively, are expressed as $$RF1(t)=A_{RF1}\cos(\omega_{RF1}t)+A_{IM1}\cos(\omega_{IM1}t) \quad \text{Eq. 1,}$$

$$LO1i(t)=\cos(\omega_{LO1}t-90°)=\sin(\omega_{LO1}t) \quad \text{Eq. 2, and}$$

$$LO1q(t)=\cos(\omega_{LO1}t) \quad \text{Eq. 3.}$$

The first term of Eq. 1 shows the desired signal, and the second term shows the image interfering signal. Eq. 2 shows a signal whose phase is 90° leading with respect to the phase of local signal 1, and Eq. 3 shows a signal whose phase is the same as that of local signal 1.

A phase shift circuit such as a poly phase filter or dividing circuit is used as a means for generating, from local signal 1, local signals LO1$i$ and LO1$q$ between which phase difference is 90° at the same frequency.

IF signals 1c and 1d supplied from mixers 35 and 36 are expressed as $$IFsignal1c(t) = RF1(t) \cdot LO1i(t) \qquad \text{Eq. 4}$$
$$= \frac{A_{RF1}}{2}\sin(\omega_{LO1}t - \omega_{RF1}t) -$$
$$= \frac{A_{IM1}}{2}\sin(\omega_{IM1}(t) - \omega_{LO1}t)$$

and $$IFsignal1d(t) = RF1(t) \cdot LO1q(t) \qquad \text{Eq. 5}$$
$$= \frac{A_{RF1}}{2}\cos(\omega_{LO1}t - \omega_{RF1}t) +$$
$$= \frac{A_{IM1}}{2}\cos(\omega_{IM1}t - \omega_{LO1}t).$$

In Eq. 4 and Eq. 5, the high-frequency component is neglected for the sake of simplicity.

Subsequently, first image rejection mixer 33 advances the phase of IF signal 1d (Eq. 5) whose phase is 90° delaying, of IF signals 1c and 1d supplied from two mixers, by 90° with the phase shift circuit such as a poly phase filter, and outputs it as IF signal 1e (Eq. 6). IF signal 1a (Eq. 7) obtained by adding IF signal 1c (Eq. 4) to IF signal 1e (Eq. 6) is supplied to first filter 17. Here, Eq. 6 and Eq. 7 are as follows:

$$IFsignal1e(t) = \frac{A_{RF1}}{2}\cos(\omega_{LO1}t - \omega_{RF1}t - 90°) + \qquad \text{Eq. 6}$$
$$= \frac{A_{IM1}}{2}\cos(\omega_{IM1}t - \omega_{LO1}t - 90°)$$
$$= \frac{A_{RF1}}{2}\sin(\omega_{LO1}t - \omega_{RF1}t) +$$
$$= \frac{A_{IM1}}{2}\sin(\omega_{IM1}t - \omega_{LO1}t)$$

and $$IFsignal1a(t) = IFsignal1c(t) + IFsignal1e(t) \qquad \text{Eq. 7}$$
$$= A_{RF1}\sin\{(\omega_{LO1} - \omega_{RF1})t\}$$
$$= A_{RF1}\sin(\omega_{IF1}t).$$

The first terms of Eq. 4 and Eq. 6 show the desired signal at the intermediate frequency, and the second terms show the image interfering signal at the intermediate frequency.

As shown in Eq. 7, first image rejection mixer 33 outputs "$\omega_{IF1}$" of the IF signal by the upper local method, and can remove the image interfering signal from reception signal RF1.

In second receiving unit 12, reception signal RF2 fed from second antenna terminal 24 and local signals LO2$i$ and LO2$q$ supplied from second local signal generating unit 29 to mixers 37 and 38, respectively, are expressed as $$RF2(t) = A_{RF2}\cos(\omega_{RF2}t) + A_{IM2}\cos(\omega_{IM2}t) \qquad \text{Eq. 8,}$$

$$LO2i(t) = \cos(\omega_{LO2}t - 90°) = \sin(\omega_{LO2}t) \qquad \text{Eq. 9, and}$$

$$LO2q(t) = \cos(\omega_{LO2}t) \qquad \text{Eq. 10.}$$

IF signals 2c and 2d supplied from mixers 37 and 38 are expressed as $$IFsignal2c(t) = RF2(t) \cdot LO2i(t) \qquad \text{Eq. 11}$$
$$= \frac{-A_{RF2}}{2}\sin(\omega_{RF2}t - \omega_{LO2}t) +$$
$$= \frac{A_{IM2}}{2}\sin(\omega_{LO2}t - \omega_{IM2}t)$$

and $$IFsignal2d(t) = RF2(t) \cdot LO2q(t) \qquad \text{Eq. 12}$$
$$= \frac{A_{RF2}}{2}\cos(\omega_{RF2}t - \omega_{LO2}t) +$$
$$= \frac{A_{IM2}}{2}\cos(\omega_{LO2}t - \omega_{IM2}t).$$

In Eq. 11 and Eq. 12, the high-frequency component is neglected for the sake of simplicity.

Subsequently, second image rejection mixer 34 advances the phase of IF signal 2c (Eq. 11) whose phase is 90° leading, of IF signals 2c and 2d supplied from two mixers, by 90° with the phase shift circuit such as a poly phase filter, and outputs it as IF signal 2e (Eq. 13). IF signal 2a (Eq. 14) obtained by adding IF signal 2d (Eq. 11) to IF signal 2e (Eq. 13) is supplied to second filter 27. Here, Eq. 13 and Eq. 14 are as follows:

$$IFsignal2e(t) = \frac{-A_{RF2}}{2}\sin(\omega_{RF2}t - \omega_{LO2}t - 90°) + \qquad \text{Eq. 13}$$
$$= \frac{A_{IM2}}{2}\sin(\omega_{LO2}t - \omega_{IM2}t - 90°)$$
$$= \frac{A_{RF2}}{2}\cos(\omega_{RF2}t - \omega_{LO2}t) -$$
$$= \frac{A_{IM2}}{2}\cos(\omega_{LO2}t - \omega_{IM2}t)$$

and $$IFsignal2a(t) = IFsignal2d(t) + IFsignal2e(t) \qquad \text{Eq. 14}$$
$$A_{RF2}\cos\{(\omega_{RF2} - \omega_{LO2})t\} = A_{RF2}\cos(\omega_{IF2}t).$$

The first terms of Eq. 11 and Eq. 13 show the desired signal at the intermediate frequency, and the second terms show the image interfering signal at the intermediate frequency.

As shown in Eq. 14, second image rejection mixer 34 outputs the IF signal of "$\omega_{IF2}$" by the lower local method, and can remove the image interfering signal from reception signal RF2.

In first receiving unit 11, first image rejection mixer 33 converts the desired signal of the radio frequency into an IF signal by the upper local method, so that the desired signal of the radio frequency and the image interfering signal establish the following relationship: the frequency of the desired signal is lower than that of the image interfering signal. Therefore, first image rejection mixer 33 advances by 90° the phase of IF signal 1d whose phase is 90° delaying, of IF signals 1c and 1d supplied from two mixers 35 and 36, and adds the IF signal 1d to the other IF signal 1c. With this operation, first image rejection mixer 33 can output IF signal 1a with small image interference and improve the receiving performance of receiver 8, as shown in Eq. 1 through Eq. 7.

In second receiving unit 12, second image rejection mixer 34 converts the desired signal of the radio frequency into an IF signal by the lower local method, so that the desired signal of the radio frequency and the image interfering signal establish the following relationship: the frequency of the desired signal is higher than that of the image interfering signal. Therefore, second image rejection mixer 34 further advances by 90° the phase of IF signal 2c whose phase is 90° leading, of IF signals 2c and 2d supplied from two mixers 37 and 38, and adds the IF signal 2c to the other IF signal 2d. With this operation, second image rejection mixer 34 can output IF signal 2a with small image interference and improve the receiving performance of receiver 8, as shown in Eq. 8 through Eq. 14.

The requirement to remove the image interfering signal from the signal of the radio frequency with the first and second input filters (not shown) disposed in front stages of first and second mixers 16 and 26 of FIG. 1 is reduced, and an inexpensive filter circuit of low order for moderating the characteristic can be used. As a result, the diversity receiving can be achieved by a smaller circuit.

Phase shifter 39 for supplying a local signal to two mixers 35 and 36 in first image rejection mixer 33 may be switchable between advancing by 90° and delaying by 90° of the local signal that is supplied from first local signal generating unit 19. Similarly, phase shifter 40 for supplying a local signal to two mixers 37 and 38 in second image rejection mixer 34 may be switchable between advancing by 90° and delaying by 90° of the local signal that is supplied from second local signal generating unit 29. Thus, first receiving unit 11 and second receiving unit 12 are not limited to receiving units dedicated to the upper local method or lower local method, and may be general-purpose receiving units.

First image rejection mixer 33 having a structure where a phase shifter for advancing the phase by 90° is coupled to only the output side of mixer 36 has been described. However, a phase shifter for delaying the phase by 45° may be coupled to the output side of mixer 35, and a phase shifter for advancing the phase by 45° may be coupled to the output side of mixer 36, for example. Even in the latter structure, first image rejection mixer 33 can output IF signal 1a with small image interference and improve the receiving performance of receiver 8.

Second image rejection mixer 34 having a structure where a phase shifter for advancing the phase by 90° is coupled to only the output side of mixer 37 has been described. However, a phase shifter for delaying the phase by 45° may be coupled to the output side of mixer 38, and a phase shifter for advancing the phase by 45° may be coupled to the output side of mixer 38, for example. Even in the latter structure, second image rejection mixer 34 can output IF signal 2a with small image interference and improve the receiving performance of receiver 8.

INDUSTRIAL APPLICABILITY

The receiver of the present invention can improve the receiving performance, and can be used in an electronic apparatus such as a mobile terminal or an on-vehicle television receiver.

The invention claimed is:

1. A receiver comprising a first receiving unit and a second receiving unit for diversity-receiving a signal of a radio frequency,
the first receiving unit including:
a first mixer for converting the received signal of the radio frequency into an IF signal of a first intermediate frequency by an upper local method using a local signal of a first frequency higher than the radio frequency; and
a first filter coupled to an output side of the first mixer,
the second receiving unit including:
a second mixer for converting the received signal of the radio frequency into an IF signal of a second intermediate frequency by a lower local method using a local signal of a second frequency lower than the radio frequency; and
a second filter coupled to an output side of the second mixer,
the receiver further comprising,
a detecting unit for detecting reception quality of a signal received by the first receiving unit and reception quality of a signal received by the second receiving unit; and
a switching circuit for switching the first receiving unit from an upper-local-type frequency converting method to a lower-local-type frequency converting method, and switching the second receiving unit from the lower-local-type frequency converting method to the upper-local-type frequency converting method, based on the detection result by the detecting unit.

2. The receiver of claim 1, wherein
the first filter passes a signal of the first intermediate frequency, of signals supplied from the first mixer, and attenuates a signal of a frequency equal to difference between the first frequency and the second frequency, and
the second filter passes a signal of the second intermediate frequency, of signals supplied from the second mixer, and attenuates a signal of a frequency equal to the difference between the first frequency and the second frequency.

3. The receiver of claim 1, further comprising a demodulating unit for demodulating an IF signal supplied from the first receiving unit and an IF signal supplied from the second receiving unit,
wherein the demodulating unit inverts a frequency spectrum of one of the IF signals.

4. The receiver of claim 1, further comprising an AD converter that is coupled to an output side of one of the first receiving unit and the second receiving unit and converts an analog signal to a digital signal based on a sampling signal of a sampling frequency,
wherein the sampling frequency is other than difference between the first frequency and the second frequency.

5. A receiver comprising a first receiving unit and a second receiving unit for diversity-receiving a signal of a radio frequency,
the first receiving unit including:
a first antenna terminal for receiving the signal of the radio frequency;
a first local oscillator for transmitting a local signal of a first frequency, the first frequency being higher than the radio frequency by a first intermediate frequency;
a first mixer for converting the signal of the radio frequency supplied from the first antenna terminal into an IF signal of the first intermediate frequency using the local signal of the first frequency supplied from the first local oscillator; and
a first filter coupled to an output side of the first mixer,
the second receiving unit including:
a second antenna terminal for receiving the signal of the radio frequency;
a second local oscillator for transmitting a local signal of a second frequency, the second frequency being lower than the radio frequency by a second intermediate frequency;

a second mixer for converting the signal of the radio frequency supplied from the second antenna terminal into an IF signal of the second intermediate frequency using the local signal of the second frequency supplied from the second local oscillator; and a second filter coupled to an output side of the second mixer, the receiver further comprising:

a detecting unit for detecting reception quality of a signal received by the first receiving unit and reception quality of a signal received by the second receiving unit; and a switching circuit for switching the first receiving unit from an upper-local-type frequency converting method to a lower-local-type frequency converting method, and switching the second receiving unit from the lower-local-type frequency converting method to the upper-local-type frequency converting method, based on the detection result by the detecting unit.

6. The receiver of claim 5, wherein
the first mixer and the second mixer are image rejection mixers for removing an image interfering signal.

7. A receiver comprising a first receiving unit and a second receiving unit for diversity-receiving a signal of a radio frequency, the first receiving unit including:
a first antenna terminal for receiving the signal of the radio frequency;
a first local oscillator for transmitting a local signal of a first frequency, the first frequency being higher than the radio frequency by a first intermediate frequency;
a first mixer for converting the signal of the radio frequency supplied from the first antenna terminal into an IF signal of the first intermediate frequency using the local signal of the first frequency supplied from the first local oscillator; and
a first filter coupled to an output side of the first mixer, the second receiving unit including:
a second antenna terminal for receiving the signal of the radio frequency;
a second local oscillator for transmitting a local signal of a second frequency, the second frequency being lower than the radio frequency by a second intermediate frequency;
a second mixer for converting the signal of the radio frequency supplied from the second antenna terminal into an IF signal of the second intermediate frequency using the local signal of the second frequency supplied from the second local oscillator; and
a second filter coupled to an output side of the second mixer, wherein the first mixer is a first image rejection mixer,
the first image rejection mixer has two mixers that are coupled to an output side of the first antenna terminal and receive local signals between which phase difference is 90°,
the first image rejection mixer advances phase of one IF signal whose phase is 90° delaying, of IF signals supplied from the two mixers, to match the phase with phase of the other IF signal, and supplies an IF signal obtained by adding the IF signal whose phase is advanced to the other IF signal to the first filter,
the second mixer is a second image rejection mixer,
the second image rejection mixer has two mixers that are coupled to an output side of the second antenna terminal and receive local signals between which phase difference is 90°, and
the second image rejection mixer further advances phase of one IF signal whose phase is 90° leading, of IF signals supplied from the two mixers, to match the phase with phase of the other IF signal, and supplies an IF signal obtained by adding the IF signal whose phase is advanced to the other IF signal to the second filter.

8. The receiver of claim 7, further comprising a phase shifter for supplying a local signal to the first mixer and the second mixer,
wherein the phase shifter can switch between advancing by 90° and delaying by 90° of local signals supplied from the local oscillators.

9. A receiver comprising a first receiving unit and a second receiving unit for diversity-receiving a signal of a radio frequency, the first receiving unit including:
a first antenna terminal for receiving the signal of the radio frequency;
a first local oscillator for transmitting a local signal of a first frequency, the first frequency being higher than the radio frequency by a first intermediate frequency;
a first mixer for converting the signal of the radio frequency supplied from the first antenna terminal into an IF signal of the first intermediate frequency using the local signal of the first frequency supplied from the first local oscillator; and
a first filter coupled to an output side of the first mixer, the second receiving unit including:
a second antenna terminal for receiving the signal of the radio frequency;
a second local oscillator for transmitting a local signal of a second frequency, the second frequency being lower than the radio frequency by a second intermediate frequency;
a second mixer for converting the signal of the radio frequency supplied from the second antenna terminal into an IF signal of the second intermediate frequency using the local signal of the second frequency supplied from the second local oscillator; and
a second filter coupled to an output side of the second mixer, wherein the first receiving unit further includes a first input filter that is coupled between the first antenna terminal and the first mixer and attenuates a signal of a frequency obtained by adding twice the first intermediate frequency to the radio frequency, and
the second receiving unit further includes a second input filter that is coupled between the second antenna terminal and the second mixer and attenuates a signal of a frequency obtained by subtracting twice the second intermediate frequency from the radio frequency.

10. An electronic apparatus comprising:
a first receiving unit and a second receiving unit for diversity-receiving a signal of a radio frequency;
a demodulating unit coupled to an output sides of the first receiving unit and the second receiving unit;
a signal processing unit coupled to an output side of the demodulating unit; and
a display unit coupled to an output side of the signal processing unit, the first receiving unit including:
the first receiving unit including:
a first antenna terminal for receiving the signal of the radio frequency;
a first local oscillator for transmitting a local signal of a first frequency, the first frequency being higher than the radio frequency by a first intermediate frequency;

a first mixer for converting the signal of the radio frequency supplied from the first antenna terminal into an IF signal of the first intermediate frequency using the local signal of the first frequency supplied from the first local oscillator; and a first filter coupled to an output side of the first mixer, the second receiving unit including:

a second antenna terminal for receiving the signal of the radio frequency;

a second local oscillator for transmitting a local signal of a second frequency, the second frequency being lower than the radio frequency by a second intermediate frequency;

a second mixer for converting the signal of the radio frequency supplied from the second antenna terminal into an IF signal of the second intermediate frequency using the local signal of the second frequency supplied from the second local oscillator; and a second filter coupled to an output side of the second mixer, the receiver further comprising:

a detecting unit for detecting reception quality of a signal received by the first receiving unit and reception quality of a signal received by the second receiving unit; and a switching circuit for switching the first receiving unit from an upper-local-type frequency converting method to a lower-local-type frequency converting method, and switching the second receiving unit from the lower-local-type frequency converting method to the upper-local-type frequency converting method, based on the detection result by the detecting unit.

* * * * *

UNITED STATES PATENT AND TRADEMARK OFFICE
CERTIFICATE OF CORRECTION

PATENT NO.        : 7,991,372 B2                                       Page 1 of 1
APPLICATION NO.   : 11/916317
DATED             : August 2, 2011
INVENTOR(S)       : Takeshi Fujii et al.

It is certified that error appears in the above-identified patent and that said Letters Patent is hereby corrected as shown below:

On the front page of patent, under Assignee, please delete "Pansonic" and instead insert -- Panasonic--.

On the front page of patent, under OTHER PUBLICATIONS, please add "International Search Report dated May 1, 2007.".

In column 7, Eq. 4, please delete the second "=".

In column 7, Eq. 5, please delete the second "=".

In column 7, Eq. 6, please delete the second and fourth "=".

Signed and Sealed this
Third Day of January, 2012

David J. Kappos
*Director of the United States Patent and Trademark Office*